US012807534B2

(12) United States Patent
Mahfouz et al.

(10) Patent No.: US 12,807,534 B2
(45) Date of Patent: Nov. 24, 2026

(54) HYBRID FIBER CONCRETE REINFORCEMENT

(71) Applicant: SAUDI ARABIAN OIL COMPANY, Dhahran (SA)

(72) Inventors: Remi Mahfouz, Dhahran (SA); Hawraa Bin Saad, Dhahran (SA); Waleed Al Nasser, Dammam (SA); Mohammed H. Mehthel, Dhahran (SA); Oscar Salazar Vidal, Dhahran (SA); Thibault Villette, Belfort (FR); Abdullatif Jazzar, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 708 days.

(21) Appl. No.: 18/326,901

(22) Filed: May 31, 2023

(65) Prior Publication Data

US 2024/0400451 A1 Dec. 5, 2024

(51) Int. Cl.

| | |
|---|---|
| ***C04B 18/02*** | (2006.01) |
| ***C04B 14/38*** | (2006.01) |
| ***C04B 14/42*** | (2006.01) |
| ***C04B 16/06*** | (2006.01) |
| ***C08J 5/24*** | (2006.01) |
| ***C08K 5/544*** | (2006.01) |

(52) U.S. Cl.

CPC .......... *C04B 18/022* (2013.01); *C04B 14/386* (2013.01); *C04B 14/42* (2013.01); *C04B 16/0683* (2013.01); *C08J 5/247* (2021.05); *C08J 5/249* (2021.05); *C08K 5/544* (2013.01); *C08J 2329/14* (2013.01); *C08J 2333/12* (2013.01); *C08J 2363/00* (2013.01); *C08J 2375/04* (2013.01); *C08J 2467/02* (2013.01)

(58) Field of Classification Search

CPC ......... C04B 18/02; C04B 14/38; C04B 14/42; C04B 16/06; C08J 5/24; C08K 5/544

USPC .......................................................... 523/222

See application file for complete search history.

(56) References Cited

U.S. PATENT DOCUMENTS

| | | | | |
|---|---|---|---|---|
| 5,727,357 | A | 3/1998 | Arumugasaamy et al. | |
| 6,612,085 | B2 * | 9/2003 | Edwards | E04C 5/03 428/397 |
| 10,343,311 | B2 | 7/2019 | Schinkinger | |
| 2004/0081816 | A1 | 4/2004 | Pyzik et al. | |
| 2012/0204499 | A1 * | 8/2012 | Brandstrom | E04C 5/07 414/800 |
| 2012/0313307 | A1 * | 12/2012 | Cartwright | C08J 5/046 267/141 |
| 2020/0032515 | A1 | 1/2020 | Hinzen | |
| 2021/0017766 | A1 | 1/2021 | Hartman et al. | |

FOREIGN PATENT DOCUMENTS

| | | | |
|---|---|---|---|
| BR | 102020024680 | A2 | 6/2022 |
| CA | 2731371 | C | 4/2011 |
| CA | 2813703 | C | 4/2020 |
| EP | 2857607 | A1 | 4/2015 |
| GB | 2333737 | A | 8/1999 |
| JP | 2010513751 | A | 4/2010 |
| WO | 2013032416 | A2 | 3/2013 |
| WO | 2014/183038 | A2 | 11/2014 |

OTHER PUBLICATIONS

International Search Report issued for corresponding international patent application No. PCT/US2024/031952, mailed Aug. 22, 2024 (5 pages).

Written Opinion issued for corresponding international patent application No. PCT/US2024/031952, mailed Aug. 22, 2024 (8 pages).

ASTM 7957 Standards: Standard Specification for Solid Round Glass Fiber Reinforced Polymer Bars for Concrete Reinforcement (5 pages).

ACI 440.6M-08 Standards: Specification for Carbon and Glass Fiber-Reinforced Polymer Bar Materials for Concrete Reinforcement (3 pages).

CSA S807-10 Standards: Specification for Fiber Reinforced Polymer, Canadian Standard Association (25 pages).

A.Ahmed et al., "A review on durability of fiber reinforced polymer (FRP) bars reinforced seawater sea sand concrete", Construction and Building Materials, 2020, vol. 256, 119484, pp. 1-18 (18 pages).

O. Starkova et al., "Long-term moisture absorption and durability of FRP pultruded rebars", Materials Today: Proceedings, 2021, vol. 34, Part 1, pp. 36-40 (5 pages).

G. Feng et al., "A review on mechanical properties and deterioration mechanisms of FRP bars under severe environmental and loading conditions", Cement & Concrete Composites, 2022, vol. 134, 104758, pp. 1-19 (19 pages).

M. M. Attia et al., "Behavior of FRP rods under uniaxial tensile strength with multiple materials as an alternative to steel rebar", Case Studies in Construction Materials, 2022, vol. 17, e01241, pp. 1-12 (12 pages).

L. Wang et al., "Comparative Study of Steel-FRP, FRP and Steel-Reinforced Coral Concrete Beams in Their Flexural Performance", Materials, 2020, vol. 13, 2097, pp. 1-17 (17 pages).

(Continued)

*Primary Examiner* — Deve V Hall

(74) *Attorney, Agent, or Firm* — Osha Bergman Watanabe & Burton LLP

(57) ABSTRACT

A FRP rebar composition includes 15-45 vol % of a polymer matrix and 55-85% of a fiber mixture in which the fiber mixture includes 50-70 vol % of a first plurality of fibers which include carbon fibers and 30-50 vol % of a second plurality of fibers which are selected from the group consisting of PET fibers, glass fiber, and combinations thereof. A method of forming a FRP rebar includes feeding a first plurality of fibers and a second plurality of fibers simultaneously into a resin impregnator, pulling the fiber mixture through a liquid polymeric resin in the resin impregnator to form a resin-soaked fiber mixture, and passing the resin-soaked fiber mixture through a heated stationary die.

20 Claims, 2 Drawing Sheets

(56) References Cited

OTHER PUBLICATIONS

M. K. Askar et al., "Flexural and shear strengthening of reinforced concrete beams using FRP composites: A state of the art", Case Studies in Construction Materials, 2022, vol. 17, e01189, pp. 1-28 (28 pages).

P. P. Lochan et al., "Determination of tensile strength of GFRP bars using flexure tests", Construction and Building Material, 2022, vol. 314, 125630 (7 pages).

W. Wu et al., "Long-time durability of GFRP bars in the alkaline concrete environment for eight years", Construction and Buildnig Materials, 2022, vol. 314, 125573, pp. 1-12 (12 pages).

Y. Liu et al., "A novel technique to improve the compressive strength and ductility of glass fiber reinforced polymer (GFRP) composite bars", Construction and Building Materials, 2022, vol. 326, 126782, pp. 1-18 (18 pages).

M. P. Rawat et al., "Comparison of steel and fiber-reinforced polymer rebars for mining applications: A numerical approach", Materials Today: Proceedings, 2020, pp. 1-5 (5 pages).

* cited by examiner

HYBRID FIBER CONCRETE REINFORCEMENT

BACKGROUND

Reinforced concrete (RC) is a composite material in which concrete's relatively low tensile strength and ductility are improved by the inclusion of reinforcement having higher tensile strength or ductility. RC used extensively in construction. Unreinforced concrete is not suitable for most construction projects because it cannot withstand the stresses created by vibrations, wind, or other forces. Reinforced materials are embedded in the concrete in such a way that the two materials resist the applied forces together. The compressive strength of concrete and the tensile strength of steel form a strong synergy to resist these stresses over a long span.

A reinforcing bar (rebar) is typically formed from ridged carbon steel; the ridges give frictional adhesion to the concrete and prevent the rebars from being pulled out of the concrete. Although concrete is very strong in compression, it is virtually without strength in tension. To compensate for this, rebars are embedded into it to carry the tensile loads on a structure. While any material with sufficient tensile strength could be used to reinforce concrete, steel is used in concrete as they both have similar coefficients of thermal expansion. This means that a concrete structural element reinforced with steel will experience minimal stress when there is a change in temperature as the two interconnected materials will expand/contract in a similar manner.

The most basic and inexpensive form of rebar consists of simple steel bars. While effective at boosting internal strength, plain steel rebars often corrode as times goes on. As rust forms on the outside of the embedded rebar, it exerts an increasing amount of pressure on the surrounding concrete, which leads to reducing the bonding strength between the two. Such internal pressure can cause the concrete slab to spontaneously crack, while also making the concrete much more vulnerable to damage caused by blows and compressive forces. The surface of the concrete may develop patches of spalling, creating rough, unattractive areas as the concrete chips and flakes away.

Fiber Reinforced Polymer (FRP) rebars have been developed as a non-corrosive alternative to steel in concrete reinforcement and are suitable for any structural or architectural application where a material that is corrosion resistant, lightweight, or non-conductive is required. FRP rebar is comprised of two elements; a fiber (usually carbon, glass, aramid, or basalt) and a resin (polyester, epoxy, or vinyl ester). The most common example of FRP rebars are Glass Fiber Reinforced Polymer (GFRP) Rebars or Carbon Fiber Reinforced Polymer (CFRP) Rebars.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a FRP rebar composition which includes: 15-45 vol % of a polymer matrix and 55-85% of a fiber mixture; in which the fiber mixture includes 50-70 vol % of a first plurality of fibers which include carbon fibers and 30-50 vol % of a second plurality of fibers which are selected from the group consisting of PET fibers, glass fibers, and combinations thereof.

In another aspect, embodiments disclosed herein relate to a method of forming a FRP rebar, which includes: feeding a first plurality of fibers and a second plurality of fibers simultaneously into a resin impregnator; pulling the fiber mixture through a liquid polymeric resin in the resin impregnator to form a resin-soaked fiber mixture; and passing the resin-soaked fiber mixture through a heated stationary die.

Other aspects and advantages of the claimed subject matter will be apparent from the following description and the appended claims.

DETAILED DESCRIPTION

FRP Rebar Composition

Figure 1:
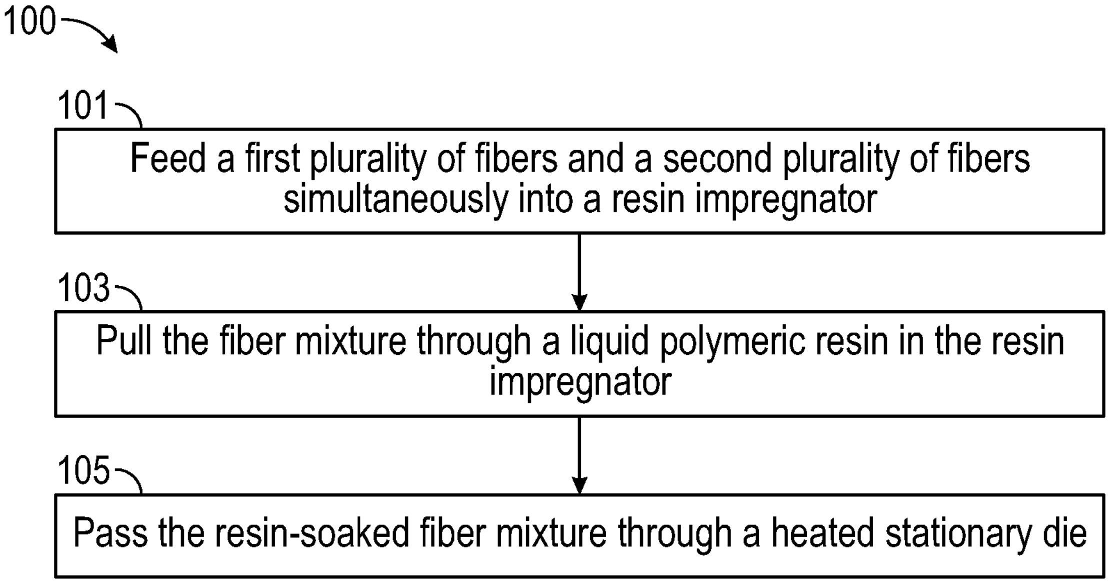
FIG. 1 is a block-flow diagram of a method in accordance with one or more embodiments of the present disclosure.

In one aspect, one or more embodiments disclosed herein relate to a FRP rebar, typically used for reinforcing concrete or similar purposes, wherein the FRP rebar includes a hybrid composition. In one or more embodiments, the hybrid composition includes 15-45 vol % of a polymer matrix and 55-85 vol. % of a fiber mixture. In one or more embodiments the fiber mixture includes 50-70 vol. % of a first plurality of fibers distributed in the polymer matrix and 30-50 vol % of a second plurality of distributed in the polymer matrix. In one or more embodiments, the FRP rebar includes a coupling agent.

In one or more embodiments, the polymer matrix of the hybrid composition may be a thermoset polymer or a thermoplastic polymer. Examples of the polymer matrix may include, a vinyl ester, a polymethyl methacrylate, an epoxy, a polyurethane, and combinations thereof. Furthermore, these polymers may be reinforced or modified with organic or mineral fillers. Examples of organic or mineral fillers include short fibers, clay particles, carbon black, elastomer inclusions, fire-retardant particles, UV stabilizers, and nanoparticles such as graphene platelets or carbon nanotubes.

In one or more embodiments, a polymer matrix may be included in the FRP rebar in an amount ranging between about 15% to about 45% by volume, based on the total volume of the FRP rebar. The polymer may be included in the FRP rebar in an amount having a lower limit of any of 15 vol. %, 16 vol. %, 17 vol. %, 18 vol. %, 19 vol. %, 20 vol. %, 21 vol. %, 22 vol. %, 23 vol. %, 24 vol. %, 25 vol. %, and 26 vol. %, to an upper limit of any of 27 vol. %, 28 vol. %, 29 vol. %, 30 vol. %, 31 vol. %, 32 vol. %, 33 vol. %, 34 vol. %, 35 vol. %, 36 vol. %, 37 vol. %, 38 vol. %, 39 vol. %, 40 vol. %, 41 vol. %, 42 vol. %, 43 vol. %, 44 vol. %, and 45 vol. %, based on the total volume of the FRP rebar, where any lower limit can be used in combination with any upper limit.

In one or more embodiments, the polymer may be a vinyl ester-based polymer having a Young's modulus ranging from between about 1500 MPa to about 4000 MPa when tested according to ISO 527. The Young's modulus of the vinyl ester-based polymer may have a lower limit of any of 1500 MPa, 1600 MPa, 1700 MPa, 1800 MPa, 1900 MPa, 2000 MPa, 2100 MPa, 2200 MPa, 2300 MPa, 2400 MPa, 2500 MPa, 2600 MPa, 2700 MPa, 2800 MPa, and 2900 MPa, and an upper limit of any of 3000 MPa, 3100 MPa, 3200 MPa, 3300 MPa, and 3400 MPa, 3500 MPa, 3600 MPa, 3700 MPa, 3800 MPa, 3900 MPa, or 4000 MPa where any lower limit may be paired to any mathematically compatible upper limit.

In one or more embodiments, the polymer may be a vinyl ester-based polymer with a strain at failure ranging from between about 2% to about 15% when tested according to ISO 527. The strain at failure of the vinyl ester-based polymer may have a lower limit of any of 2.0%, 2.5%, 3.0%, 3.5%, 4.0%, 4.5%, 5.0%, 5.5%, 6.0%, 6.5%, and 7.0% and an upper limit of any of 7.5%, 8.0%, 8.5%, 9.0%, 9.5%, 10%, 10.5%, 11.0%, 11.5%, 12.0%, 12.5%, 13.0%, 13.5%, 14.0%, 14.5% and 15.0% where any lower limit may be paired to any mathematically compatible upper limit.

In one or more embodiments, the polymer may be a vinyl ester-based polymer with a stress at failure ranging from between about 50 MPa to about 100 MPa when tested according to ASTM D638. The stress at failure of the vinyl ester-based polymer may have a lower limit of any of 50 MPa, 55 MPa, 60 MPa, 65 MPa, and 70 MPa and an upper limit of any of 75 MPa, 80 MPa, 85 MPa, 90 MPa, 95 MPa, and 100 MPa where any lower limit may be paired to any mathematically compatible upper limit.

In one or more embodiments, the polymer may be a vinyl ester-based polymer with a density ranging from between about 1,000 kg/m3 to about 1,200 kg/m3 when measured according to ASTM D1505-18. The density may be in an amount having a lower limit of any of 1,020 kg/m3, 1,040 kg/m3, 1,060 kg/m3, 1,080 kg/m3, and 1,100 kg/m3 to an upper limit of any of 1,110 kg/m3, 1,120 kg/m3, 1,140 kg/m3, 1,160 kg/m3, 1,180 kg/m3, and 1,200 kg/m3 where any lower limit may be paired to any mathematically compatible upper limit.

In one or more embodiments, the polymer may be a vinyl ester-based polymer with a glass transition temperature (Tg) ranging from between about 100° C. to about 120° C. when measured according to ASTM E1356. The glass transition temperature (Tg) may be in an amount having a lower limit of any of 100° C. 101° C., 102° C. 103° C., 104° C., 105° C., 106° C., 107° C., 108° C., 109° C., and 110° C. to an upper limit of any of 110° C., 111° C., 112° C., 113° C. 114° C., 115° C., 116° C., 117° C., 118° C., 119° C., and 120° C. where any lower limit may be paired to any mathematically compatible upper limit.

In one or more embodiments, the polymer may be a polymethylmethacrylate-based polymer having a Young's modulus ranging from between about 2000 MPa to about 4000 MPa when tested according to ISO 527. The Young's modulus of the polymethylmethacrylate-based polymer may have a lower limit of any of 2000 MPa, 2100 MPa, 2200 MPa, 2300 MPa, 2400 MPa, 2500 MPa, 2600 MPa, 2700 MPa, 2800 MPa, and 2900 MPa, and an upper limit of any of 3000 MPa, 3100 MPa, 3200 MPa, 3300 MPa, 3400 MPa, 3500 MPa, 3600 MPa, 3700 MPa, 3800 MPa, 3900 MPa, and 4000 MPa where any lower limit may be paired to any mathematically compatible upper limit.

In one or more embodiments, the polymer may be a polymethylmethacrylate-based polymer with a strain at failure ranging from between about 2% to about 10% when tested according to ISO 527. The strain at failure of the polymethylmethacrylate-based polymer may have a lower limit of any of 2.0%, 2.5%, 3.0%, 3.5%, 4.0%, 4.5%, 5.0%, 5.5%, 6.0%, 6.5%, and 7.0% and an upper limit of any of 7.5%, 8.0%, 8.5%, 9.0%, 9.5%, and 10% where any lower limit may be paired to any mathematically compatible upper limit.

In one or more embodiments, the polymer may be a polymethylmethacrylate-based polymer with a stress at failure ranging from between about 60 MPa to about 90 MPa when tested according to ASTM D638. The stress at failure of the polymethylmethacrylate-based polymer may have a lower limit of any of 60 MPa, 65 MPa, and 70 MPa and an upper limit of any of 75 MPa, 80 MPa, 85 MPa, and 90 MPa where any lower limit may be paired to any mathematically compatible upper limit.

In one or more embodiments, the polymer may be a polymethylmethacrylate-based polymer with a density ranging from between about 1,100 kg/m3 to about 1,300 kg/m3 when measured according 3 to ASTM D1505-18. The density of the polymethylmethacrylate-based polymer may be in an amount having a lower limit of any of 1,100 kg/m3, 1,110 kg/m3, 1,120 kg/m3, 1,130 kg/m3, 1,140 kg/m3, 1,150 kg/m3, 1,160 kg/m3, 1,170 kg/m3, 1,180 kg/m3, 1,190 kg/m3, and 1,200 kg/m3 to an upper limit of any of 1,210 kg/m3, 1,220 kg/m3, 1,230 kg/m3, 1,240 kg/m3, 1,250 kg/m3, 1,260 kg/m3, 1,270 kg/m3, 1,280 kg/m3, 1,290 kg/m3, and 1,300 kg/m3 where any lower limit may be paired to any mathematically compatible upper limit.

In one or more embodiments, the polymer may be an epoxy-based polymer having a Young's modulus ranging from between about 2300 MPa to about 4000 MPa when tested according to ISO 527. The Young's modulus of the an epoxy-based polymer may have a lower limit of any of 2300 MPa, 2400 MPa, 2500 MPa, 2600 MPa, 2700 MPa, 2800 MPa, and 2900 MPa, and an upper limit of any of 3000 MPa, 3100 MPa, 3200 MPa, 3300 MPa, 3400 MPa, 3500 MPa, 3600 MPa, 3700 MPa, 3800 MPa, 3900 MPa, and 4000 MPa where any lower limit may be paired to any mathematically compatible upper limit.

In one or more embodiments, the polymer may be an epoxy-based polymer with a strain at failure ranging from between about 1% to about 7% when tested according to ISO 527. The strain at failure of the epoxy-based polymer may have a lower limit of any of the 1.0%, 1.5%, 2.0%, 2.5%, 3.0%, 3.5%, and 4.0%, and an upper limit of any of 4.5%, 5.0%, 5.5%, 6.0%, 6.5%, and 7.0% where any lower limit may be paired to any mathematically compatible upper limit.

In one or more embodiments, the polymer may be an epoxy-based polymer with a stress at failure ranging from between about 40 MPa to about 100 MPa when tested according to ASTM D638. The stress at failure of the epoxy-based polymer may have a lower limit of any of 40 MPa, 45 MPa, 50 MPa, 55 MPa, 60 MPa, 65 MPa, and 70 MPa and an upper limit of any of 75 MPa, 80 MPa, 85 MPa, 90 MPa, 95 MPa and 100 MPa where any lower limit may be paired to any mathematically compatible upper limit.

In one or more embodiments, the polymer may be an epoxy-based polymer with a density ranging from between about 1,100 kg/m3 to about 1,500 kg/m3 when measured according to ASTM D1505-18. The density of the epoxy-based polymer may be in an amount having a lower limit of any of 1,100 kg/m3, 1,110 kg/m3, 1,120 kg/m3, 1,130 kg/m3, 1,140 kg/m3, 1,150 kg/m3, 1,160 kg/m3, 1,170 kg/m3, 1,180 kg/m3, 1,190 kg/m3, 1,200 kg/m3 1,210 kg/m3, 1,220 kg/m3, 1,230 kg/m3, 1,240 kg/m3, 1,250 kg/m3, 1,260 kg/m3, 1,270 kg/m3, 1,280 kg/m3, 1,290 kg/m3, and 1,300 kg/m3, to an upper limit of any of 1,310 kg/m3, 1,320 kg/m3, 1,330 kg/m3, 1,340 kg/m3, 1,350 kg/m3, 1,360 kg/m3, 1,370 kg/m3, 1,380 kg/m3, 1,390 kg/m3, 1,400 kg/m3 1,410 kg/m3, 1,420 kg/m3, 1,430 kg/m3, 1,440 kg/m3, 1,450 kg/m3, 1,460 kg/m3, 1,470 kg/m3, 1,480 kg/m3, 1,490 kg/m3, and 1,500 kg/m3 where any lower limit may be paired to any mathematically compatible upper limit.

In one or more embodiments, the polymer may be a polyurethane-based polymer having a Young's modulus ranging from between about 900 MPa to about 2000 MPa when tested according to ISO 527. The Young's modulus of the polyurethane-based polymer may have a lower limit of any of 900 MPa, 910 MPa, 920 MPa, 930 MPa, 940 MPa, 950 MPa, 960 MPa, 970 MPa, 980 MPa, 900 MPa, and 1000 MPa, and an upper limit of any of 1100 MPa, 1200 MPa, 1300 MPa, 1400 MPa, 1500 MPa, 1600 MPa, 1700 MPa, 1800 MPa, 1900 MPa, and 2000 MPa where any lower limit may be paired to any mathematically compatible upper limit.

In one or more embodiments, the polymer may be a polyurethane-based polymer with a strain at failure ranging from between about 2% to about 50% when tested according to ISO 527. The strain at failure of the polyurethane-based polymer may have a lower limit of any of 2.0%, 2.5%, 3.0%, 3.5%, 4.0%, 4.5%, 5.0%, 5.5%, 6.0%, 6.5%, 7.0% 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, and 25.0%, and an upper limit of any of 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 41.0%, 41.5%, 42.0%, 42.5%, 43.0%, 43.5%, 44.0%, 44.5%, 45.0%, 45.5%, 46.0%, 46.5%, 47.0%, 47.5%, 48.0%, 48.5%, 49.0%, 49.5%, and 50.0% where any lower limit may be paired to any mathematically compatible upper limit.

In one or more embodiments, the polymer may be a polyurethane-based polymer with a stress at failure ranging from between about 5 MPa to about 25 MPa when tested according to ASTM D638. The stress at failure of the polyurethane-based polymer may have a lower limit of any of 5 MPa, 10 MPa, and 15 MPa and an upper limit of any of 20 and 25 MPa where any lower limit may be paired to any mathematically compatible upper limit.

In one or more embodiments, the polymer may be a polyurethane-based polymer with a density ranging from between about 1,100 kg/m3 to about 1,300 kg/m3 when measured according to ASTM D1505-18. The density of the polyurethane-based polymer may be in an amount having a lower limit of any of 1,100 kg/m3, 1,110 kg/m3, 1,120 kg/m3, 1,130 kg/m3, 1,140 kg/m3, 1,150 kg/m3, 1,160 kg/m3, 1,170 kg/m3, 1,180 kg/m3, 1,190 kg/m3, and 1,200 kg/m3 to an upper limit of any of 1,210 kg/m3, 1,220 kg/m3, 1,230 kg/m3, 1,240 kg/m3, 1,250 kg/m3, 1,260 kg/m3, 1,270 kg/m3, 1,280 kg/m3, 1,290 kg/m3, and 1,300 kg/m3 where any lower limit may be paired to any mathematically compatible upper limit.

Fiber mixture in this disclosure refers to a mixture of fibers formed when a first plurality of fibers and a second plurality of fibers are intermixed. The fibers may be intermixed in a method of forming a FRP rebar in accordance with one or more embodiments of this disclosure. The method may include mixing them first as fibers. The method may include setting the fibers together in a cured FRP rebar in a mixed form. It will be appreciated by one skilled in the art that the properties of a mixture of fibers may depend on the type, size, and relative loading level of the first plurality of fibers and second plurality of fibers.

In one or more embodiments, the first plurality of fibers may include carbon fibers. It should be recognized by one skilled in the art that although carbon fibers may be used, other fibers with similar physical and chemical properties could be used.

In one or more embodiments, the first plurality of fibers may be included in the FRP rebar in an amount ranging between about 45% to about 75% by volume, based on the total volume of the FRP rebar. The first plurality of fibers may be included in the FRP rebar in an amount having a lower limit of any of 45 vol. %, 46 vol. %, 47 vol. %, 48%, 49 vol. %, 50 vol. %, 51 vol. %, 52 vol. %, 53 vol. %, 54 vol. %, 55 vol. %, 56 vol. %, 57 vol. %, 58 vol. %, 59 vol. %, or 60 vol. %, to an upper limit of any of 61 vol. %, 62 vol. %, 63 vol. %, 64 vol. %, 65 vol. %, 66 vol. %, 67 vol. %, 68 vol. %, 69 vol. %, 70 vol. %, 71 vol. %, 72 vol. %, 73 vol. %, 74 vol. %, or 75 vol. %, based on the total volume of the FRP rebar, where any lower limit can be used in combination with any upper limit.

In one or more embodiments, the first plurality of fibers may be included in the fiber mixture in an amount ranging between about 50% to about 70% by volume, based on the total volume of the fiber mixture. The first plurality of fibers may be included in the fiber mixture in an amount having a lower limit of any of 50 vol. %, 51 vol. %, 52 vol. %, 53 vol. %, 54 vol. %, 55 vol. %, 56 vol. %, 57 vol. %, 58 vol. %, 59 vol. %, or 60 vol. %, to an upper limit of any of 61 vol. %, 62 vol. %, 63 vol. %, 64 vol. %, 65 vol. %, 66 vol. %, 67 vol. %, 68 vol. %, 69 vol. %, or 70 vol. %, based on the total weight of the hybrid composition, where any lower limit can be used in combination with any upper limit.

In one or more embodiments, the first plurality of fibers may be selected from carbon fibers with a Young's modulus ranging from between about 150,000 MPa to about 900,000 MPa when tested according to ASTM D3822M-14. The Young's modulus may be in an amount having a lower limit of any of 150,000 MPa, 200,000 MPa, 250,000 MPa, 300,000 MPa, 350,000 MPa, 400,000, and 450,000 MPa to an upper limit of any of 500,000 MPa, 550,000 MPa, 600,000 MPa, 650,000 MPa, 700,000 MPa, 750,000 MPa, 800,000 MPa, 850,000 MPa, and 900,000 MPa, where any lower limit may be paired to any mathematically compatible upper limit.

In one or more embodiments, the first plurality of fibers may be selected from carbon fibers with a strain at failure ranging from between about 0.3% to about 2.0% when tested according to ASTM D3822M-14. The strain at failure may be in an amount having a lower limit of any of 0.3%, 0.4%, 0.5%, 0.6%, 0.7%, 0.8%, 0.9%, 1.0%, 1.1%, 1.2%, 1.3%, 1.4%, and 1.5% to an upper limit of any of 1.6%, 1.7%, 1.8%, 1.9%, and 2.0% where any lower limit may be paired to any mathematically compatible upper limit.

In one or more embodiments, the first plurality of fibers may be selected from carbon fibers with a stress at failure ranging from between about 1.0 GPa to about 7.0 GPa when tested according to ASTM D3822M-14. The stress at failure may be in an amount having a lower limit of any of 1.0 GPa, 1.1 GPa, 1.2 GPa, 1.3 GPa, 1.4 GPa, 1.5 GPa, 1.6 GPa, 1.7 GPa, 1.8 GPa, 1.9 GPa, 2.0 GPa, 2.1 GPa, 2.2 GPa, 2.3 GPa, 2.4 GPa, 2.5 GPa, 2.6 GPa, 2.7 GPa, 2.8 GPa, 2.9 GPa, 3.0 GPa, 3.1 GPa, 3.2 GPa, 3.3 GPa, 3.4 GPa, or 3.5 GPa, 3.6 GPa, 3.7 GPa, 3.8 GPa, 3.9 GPa, 4.0 GPa, 4.1 GPa, 4.2 GPa, 4.3 GPa, 4.4 GPa, and 4.5 GPa to an upper limit of any of 4.6 GPa, 4.7 GPa, 4.8 GPa, 4.9 GPa, 5.0 GPa, 5.1 GPa, 5.2 GPa, 5.3 GPa, 5.4 GPa, 5.5 GPa, 5.6 GPa, 5.7 GPa, 5.8 GPa, 5.9 GPa, 6.0 GPa, 6.1 GPa, 6.2 GPa, 6.3 GPa, 6.4 GPa, 6.5 GPa, 6.6 GPa, 6.7 GPa, 6.8 GPa, 6.9 GPa, and 7.0 GPa, where any lower limit may be paired to any mathematically compatible upper limit.

In one or more embodiments, the first plurality of fibers may be selected from carbon fibers with a density ranging from between about 1,700 kg/m3 to about 2,200 kg/m3 when tested according to ASTM D3800-16. The density may be in an amount having a lower limit of any of 1,710 kg/m3, 1,720 kg/m3, 1,730 kg/m3, 1,740 kg/m3, and 1,750 kg/m3 to an upper limit of any of 1,760 kg/m3, 1,770 kg/m3, 1,780 kg/m3, 1,790 kg/m3, 1,800 kg/m3, 1,910 kg/m3, 1,920 kg/m3, 1,930 kg/m3, 1,940 kg/m3, 1,950 kg/m3, 1,960 kg/m3, 1,970 kg/m3, 1,980 kg/m3, 1,990 kg/m3, 2,000 kg/m3, 2,100 kg/m3, and 2,000 kg/m3 where any lower limit may be paired to any mathematically compatible upper limit.

In one or more embodiments, the first plurality of fibers may be selected from carbon fibers with a diameter ranging from between about 6 μm to about 20 μm. The diameter may be in an amount having a lower limit of any of 6 μm, 7 μm, 8 μm, 9 μm, 10 μm, 11 μm, and 12 μm, to an upper limit of any of 13 μm, 14 μm, 15 μm, 16 μm, 17 μm, 18 μm, 19 μm, and 20 μm, where any lower limit may be paired to any mathematically compatible upper limit.

In one or more embodiments, the second plurality of fibers may be selected from the group consisting of glass fiber, PET fibers. It should be recognized by one skilled in the art that although glass or PET fibers may be used, other fibers with similar physical and chemical properties could be used in place of each of those, such as other polyester fibers similar to PET.

In one or more embodiments, the second plurality of fibers may be included in the FRP rebar in an amount ranging between about 25% to about 55% by volume, based on the total volume of the FRP rebar. The second plurality of fibers may be included in the FRP rebar in an amount having a lower limit of any of 25 vol. %, 26 vol. %, 27 vol. %, 28%, 29 vol. %, 30 vol. %, 31 vol. %, 32 vol. %, 33 vol. %, 34 vol. %, 35 vol. %, 36 vol %, 37 vol. %, 38 vol. %, 39 vol. %, or 40 vol %, to an upper limit of any of 41 vol. %, 42 vol %, 43 vol. %, 44 vol. %, 45 vol. %, 46 vol. %, 47 vol. %, 48 vol. %, 49 vol. %, 50 vol. %, 51 vol. %, 52 vol. %, 53 vol. %, 54 vol. %, or 55 vol. %, based on the total volume of the FRP rebar, where any lower limit can be used in combination with any upper limit.

In one or more embodiments, the second plurality of fibers may be included in the fiber mixture in an amount ranging between about 30% to about 50% by volume, based on the total volume of the fiber mixture. The second plurality of fibers may be included in the fiber mixture in an amount having a lower limit of any of any of 30 vol. %, 31 vol. %, 32 vol. %, 33 vol. %, 34 vol. %, 35 vol. %, 36 vol %, 37 vol. %, 38 vol. %, 39 vol. %, or 40 vol %, to an upper limit of any of 41 vol. %, 42 vol %, 43 vol. %, 44 vol. %, 45 vol. %, 46 vol. %, 47 vol. %, 48 vol. %, 49 vol. %, or 50 vol. %, based on the total weight of the hybrid composition, where any lower limit can be used in combination with any upper limit.

In one or more embodiments, the second plurality of fibers may be selected from glass fibers with a Young's modulus ranging from between about 50,000 MPa to about 90,000 MPa when tested according to ASTM D3822M-14. The Young's modulus may be in an amount having a lower limit of any of 50,000 MPa, 51,000 MPa, 52,000 MPa, 53,000 MPa, 54,000 MPa, 55,000 MPa, 56,000 MPa, 57,000 MPa, 58,000 MPa, 59,000 MPa, 60,000 MPa, 61,000 MPa, 62,000 MPa, 63,000 MPa, 64,000 MPa and 65,000 MPa to an upper limit of any of 66,000 MPa, 67,000 MPa, 68,000 MPa, 69,000 MPa, 70,000 MPa, 71,000 MPa, 72,000 MPa, 73,000 MPa, 74,000 MPa, 75,000 MPa, 76,000 MPa, 77,000 MPa, 78,000 MPa, 79,000 MPa, 80,000 MPa, 81,000 MPa, 82,000 MPa, 83,000 MPa, 84,000 MPa, 85,000 MPa, 86,000 MPa, 87,000 MPa, 88,000 MPa, 89,000 MPa and 90,000 MPa, where any lower limit may be paired to any mathematically compatible upper limit.

In one or more embodiments, the second plurality of fibers may be selected from glass fibers with a strength at failure ranging from between about 1.0 GPa to about 4.0 GPa when tested according to ASTM D3822M-14. The strength at failure may be in an amount having a lower limit of any of 1.0 GPa, 1.1 GPa, 1.4 GPa, 1.3 GPa, 1.4 GPa, 1.5 GPa, 1.6 GPa, 1.7 GPa, 1.8 GPa, 1.9 GPa, and 2.0 GPa, to an upper limit of any of 2.1 GPa, 2.2 GPa, 2.3 GPa, 2.4 GPa, 2.5 GPa, 2.6 GPa, 2.7 GPa, 2.8 GPa, 2.9 GPa, 3.0 GPa, 3.1 GPa, 3.2 GPa, 3.3 GPa, 3.4 GPa, or 3.5 GPa, 3.6 GPa, 3.7 GPa, 3.8 GPa, 3.9 GPa, and 4.0 GPa, where any lower limit may be paired to any mathematically compatible upper limit.

In one or more embodiments, the second plurality of fibers may be selected from glass fibers with a density ranging from between about 2,000 $kg/m^3$ to about 3,000 $kg/m^3$ when tested according to ASTM D3800-16. The density may be in an amount having a lower limit of any of 2,000 $kg/m^3$, 2,050 $kg/m^3$, 2,100 $kg/m^3$, 2,150 $kg/m^3$, 2,200 $kg/m^3$, 2,250 $kg/m^3$, 2.300 $kg/m^3$, 2,350 $kg/m^3$, and 2,400 $kg/m^3$ to an upper limit of any of 2,450 $kg/m^3$, 2,500 $kg/m^3$, 2,550 $kg/m^3$, 2,600 $kg/m^3$, 2,650 $kg/m^3$, 2,700 $kg/m^3$, 2,750 $kg/m^3$, 2,800 $kg/m^3$, 2,850 $kg/m^3$, 2,900 $kg/m^3$, 2,950 $kg/m^3$, and 3,000 $kg/m^3$ where any lower limit may be paired to any mathematically compatible upper limit.

In one or more embodiments, the second plurality of fibers may be selected from glass fibers with a diameter ranging from between about 5 μm to about 25 μm. The diameter may be in an amount having a lower limit of any of 5 μm, 6 μm, 7 μm, 8 μm, 9 μm, 10 μm, 11 μm, and 12 μm, to an upper limit of any of 13 μm, 14 μm, 15 μm, 16μ m, 17 μm, 18 μm, 19 μm, 20 μm, 21 μm, 22 μm, 23 μm, 24 μm and 25 μm, where any lower limit may be paired to any mathematically compatible upper limit.

In one or more embodiments, the second plurality of fibers may be selected from PET fibers with a Young's modulus ranging from between about 10,000 MPa to about 20,000 MPa when tested according to ASTM D3822M-14. The Young's modulus may be in an amount having a lower limit of any of 10,000 MPa, 11,000 MPa, 12,000 MPa, 13,000 MPa, 14,000 MPa, and 15,000 MPa to an upper limit of any of 16,000 MPa, 17,000 MPa, 18,000 MPa, 19,000 MPa, and 20,000 MPa, where any lower limit may be paired to any mathematically compatible upper limit.

In one or more embodiments, the second plurality of fibers may be selected from PET fibers with a strength at failure ranging from between about 500 MPa to about 800 MPa when tested according to ASTM D3822M-14. The strength at failure may be in an amount having a lower limit of any of 500 MPa, 510 MPa, 510 MPa, 520 MPa, 530 MPa, 540 MPa, 550 MPa, 560 MPa, 570 MPa, 580 MPa, and 600 MPa, to an upper limit of any of 700 MPa, 710 MPa, 720 MPa, 730 MPa, 740 MPa, 750 MPa, 760 MPa, 770 MPa, 780 MPa, 790 MPa, and 800 MPa, where any lower limit may be paired to any mathematically compatible upper limit.

In one or more embodiments, the second plurality of fibers may be selected from PET fibers with a density ranging from between about 1,000 kg/m$^3$ to about 1.500 kg/m$_3$ when tested according to ASTM D3800-16. The density may be in an amount having a lower limit of any of 1,000 kg/m$^3$, 1,050 kg/m$^3$, 1,100 kg/m$^3$, 1,150 kg/m$^3$, 1,200 kg/m$^3$, and 1,250 kg/m$^3$, to an upper limit of any of 1,300 kg/m$^3$, 1,350 kg/m$^3$, 1,400 kg/m$^3$, 1,450 kg/m$^3$, and 1,500 kg/m$^3$ where any lower limit may be paired to any mathematically compatible upper limit.

In one or more embodiments, the second plurality of fibers may be selected from PET fibers with a diameter ranging from between about 3 μm to about 15 μm. The diameter may be in an amount having a lower limit of any of 3 μm, 4 μm, 5 μm, 6 μm, 7 μm, 8 μm, 9 μm, and 10 μm, to an upper limit of any of 11 μm, 12 μm, 13 μm, 14 μm, and 15 μm, where any lower limit may be paired to any mathematically compatible upper limit.

In one or more embodiments, the FRP rebar has a tensile strength between about 1.0 GPa to about 3.0 GPa. The tensile strength in such an embodiment may be in an amount having a lower limit of any of 1.0 GPa, 1.1 GPa, 1.2 GPa, 1.3 GPa, 1.4 GPa, 1.5 GPa, and 1.6 GPa, to an upper limit of any of 1.7 GPa, 1.8 GPa, 1.9 GPa, 2.0 GPa, 2.1 GPa, 2.2 GPa, 2.3 GPa, 2.4 GPa, 2.5 GPa, 2.6 GPa, 2.7 GPa, 2.8 GPa, 2.9 GPa, and 3.0 GPa, where any lower limit may be paired to any mathematically compatible upper limit. In one or more embodiments wherein the polymer matrix makes up 30 vol. %, carbon fibers make up 42 vol. %, and PET fibers make up 28 vol %, all relative to the total volume of the FRP rebar, the FRP rebar has a tensile strength between about 1.0 GPa to about 2 GPa. The tensile strength in such an embodiment may be in an amount having a lower limit of any of 1.0 GPa, 1.1 GPa, 1.2 GPa, 1.3 GPa, 1.4 GPa, and 1.5 GPa, to an upper limit of any of 1.6 GPa, 1.7 GPa, 1.8 GPa, 1.9 GPa, and 2.0 GPa, where any lower limit may be paired to any mathematically compatible upper limit. In one or more embodiments wherein the polymer matrix makes up 30 vol. %, carbon fibers make up 42 vol. %, and glass fibers make up 28 vol %, all relative to the total volume of the FRP rebar, the FRP rebar has a tensile strength between about 1.5 GPa to about 3.0 GPa. The tensile strength in such an embodiment may be in an amount having a lower limit of any of 1.5 GPa, 1.6 GPa, 1.7 GPa, 1.8 GPa, 1.9 GPa, 2.0 GPa, 2.1 GPa, and 2.2 GPa, to an upper limit of any of 2.3 GPa, 2.4 GPa, 2.5 GPa, 2.6 GPa, 2.7 GPa, 2.8 GPa, 2.9 GPa, 3.0 GPa, where any lower limit may be paired to any mathematically compatible upper limit. The tensile strength may be measured by ASTM D-7205. In one or more embodiments, the FRP rebar has a Young's modulus between about 50 GPa to about 200 Gpa. The Young's modulus in such an embodiment may be in an amount having a lower limit of any of 50 GPa, 60 GPa, 70 GPa, 80 GPa, 90 GPa, 100 GPa, and 110 GPa, to an upper limit of any of 120 GPa, 130 GPa, 140 GPa, 150 GPa, 160 GPa, 170 GPa, 180 GPa, 190 GPa, and 200 GPa, where any lower limit may be paired to any mathematically compatible upper limit. In one or more embodiments wherein the polymer matrix makes up 30 vol. %, carbon fibers make up 42 vol. %, and PET fibers make up 28 vol %, all relative to the total volume of the FRP rebar, the FRP rebar has a Young's modulus between about 50 GPa to about 200 GPa. The Young's modulus in such an embodiment may be in an amount having a lower limit of any of 50 GPa, 60 GPa, 70 GPa, 80 GPa, 90 GPa, 100 GPa, and 110 GPa, to an upper limit of any of 120 GPa, 130 GPa, 140 GPa, 150 GPa, 160 GPa, 170 GPa, 180 GPa, 190 GPa, and 200 GPa, where any lower limit may be paired to any mathematically compatible upper limit. In one or more embodiments wherein the polymer matrix makes up 30 vol. %, carbon fibers make up 42 vol. %, and glass fibers make up 28 vol %, all relative to the total volume of the FRP rebar, the FRP rebar has a Young's modulus between about 50 GPa to about 200 GPa. The Young's modulus in such an embodiment may be in an amount having a lower limit of any of 50 GPa, 60 GPa, 70 GPa, 80 GPa, 90 GPa, 100 GPa, and 110 GPa, to an upper limit of any of 120 GPa, 130 GPa, 140 GPa, 150 GPa, 160 GPa, 170 GPa, 180 GPa, 190 GPa, and 200 GPa, where any lower limit may be paired to any mathematically compatible upper limit. The Young's modulus may be derived from the formula Y=FA×LΔL, where Y=Young's modulus, L=length of the rebar, A=area of cross-section of the rebar, ΔL=change in length of the rebar when stretched with a force as per the ASTM standard D-7205.

In one or more embodiments, the FRP rebar has a ultimate tensile strain between about 0.5% to 3%. The ultimate tensile strain in such an embodiment may be in an amount having a lower limit of any of 0.5%, 0.6%, 0.7%, 0.8%, 0.9%, 1.0%, 1.1%, 1.2%, 1.3%, 1.4%, and 1.5% to an upper limit of any of 1.6%, 1.7%, 1.8%, 1.9%, 2.0%, 2.1%, 2.2%, 2.3%, 2.4%, 2.5%, 2.6%, 2.7%, 2.8%, 2.9%, and 3.0%, where any lower limit may be paired to any mathematically compatible upper limit. In one or more embodiments wherein the polymer matrix makes up 30 vol. %, carbon fibers make up 42 vol. %, and PET fibers make up 28 vol %, all relative to the total volume of the FRP rebar, the FRP rebar has an ultimate tensile strain ranging from between about 0.5% to about 2.0%. The ultimate tensile strain in such an embodiment may be in an amount having a lower limit of any of 0.5%, 0.6%, 0.7%, 0.8%, 0.9%, 1.0%, 1.1%, and 1.2% to an upper limit of any of 1.3%, 1.4%, 1.5%, 1.6%, 1.7%, 1.8%, 1.9%, and 2.0% where any lower limit may be paired to any mathematically compatible upper limit. In one or more embodiments wherein the polymer matrix makes up 30 vol. %, carbon fibers make up 42 vol. %, and glass fibers make up 28 vol %, all relative to the total volume of the FRP rebar, the FRP rebar has an ultimate tensile strain ranging from between about 1.5% to about 3.0%. The ultimate tensile strain in such an embodiment may be in an amount having a lower limit of any of 1.5%, 1.6%, 1.7%, 1.8%, 1.9%, 2.0%, and 2.1%, to an upper limit of any of 2.2%, 2.3%, 2.4%, 2.5%, 2.6%, 2.7%, 2.8%, 2.9%, and 3.0%, where any lower limit may be paired to any mathematically compatible upper limit. The ultimate tensile strain may be measured by ASTM D-7205.

In one or more embodiments, the FRP rebar has a shear strength between about 130 MPa to about 400 MPa. The shear strength in such an embodiment may be in an amount having a lower limit of any of 130 MPa, 140 MPa, 150 MPa, 160 MPa, 170 MPa, 180 MPa, 190 MPa, 200 MPa, 210 MPa, 220 MPa, 230 MPa, 240 MPa, 250 MPa, and 260 MPa, to an upper limit of any of 270 MPa, 280 MPa, 290 MPa, 300 MPa, 310 MPa, 320 MPa, 330 MPa, 340 MPa, 350 MPa, 360 MPa, 370 MPa, 380 MPa, 390 MPa, and 400 MPa, where any lower limit may be paired to any mathematically compatible upper limit. In one or more embodiments wherein the polymer matrix makes up 30 vol. %, carbon fibers make up 42 vol. %, and PET fibers make up 28 vol %, all relative to the total volume of the FRP rebar, the FRP rebar has a shear strength between about 200 MPa to about 400 MPa. The shear strength in such an embodiment may be in an amount having a lower limit of any of 200 MPa, 210 MPa, 220 MPa, 230 MPa, 240 MPa, 250 MPa, 260 MPa, 270 MPa, and 280 MPa, to an upper limit of any of 290 MPa, 300 MPa, 310 MPa, 320 MPa, 330 MPa, 340 MPa, 350 MPa, 360 MPa, 370 MPa, 380 MPa, 390 MPa, and 400 MPa, where any lower limit may be paired to any mathematically compatible upper limit. In one or more embodiments wherein the polymer matrix makes up 30 vol. %, carbon fibers make up 42 vol. %, and glass fibers make up 28 vol %, all relative to the total volume of the FRP rebar, the FRP rebar has a shear strength between about 240 MPa to about 400 MPa. The shear strength in such an embodiment may be in an amount having a lower limit of any of 240 MPa, 250 MPa, 260 MPa, 270 MPa, 280 MPa, 290 MPa, 300 MPa, and 310 MPa, to an upper limit of any of 320 MPa, 330 MPa, 340 MPa, 350 MPa, 360 MPa, 370 MPa, 380 MPa, 390 MPa, and 400 MPa, where any lower limit may be paired to any mathematically compatible upper limit. The shear strength may be measured by the following method. Shear strength tests are conducted by fitting a bar sample into a double shear fixture with appropriate steel blades and clamped into place. The fixture is placed inside a mechanical testing machine, and load is applied onto the upper blade until the sample is broken. During the test, the applied load and the crosshead displacement are recorded. The length of the specimens must be 225 mm, regardless of the bar diameter. During each test, several load peaks might appear and hence, the test shall not be stopped until the load drops below 70% of the maximum load value achieved during the test.

In one or more embodiments, the coupling agent couples the polymer matrix and fibers. In one or more embodiments, the coupling agent may be present at about 1 wt % to 3 wt % in the FRP rebar relative to the total weight of the FRP rebar. In one or more embodiments, the FRP rebar includes about 97 wt % to about 99 wt % of the hybrid composition and about 1 to about 3 wt % of the coupling agent. The coupling agent level may be in an amount having a lower limit of any of 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, and 2.0 wt %, to an upper limit of 2.1 wt %, 2.2 wt %, 2.3 wt %, 2.4 wt %, 2.5 wt %, 2.6 wt %, 2.7 wt %, 2.8 wt %, 2.9, and 3.0 wt %, where any lower limit may be paired to any mathematically compatible upper limit. Although this is the typical loading level, one skilled in the art will recognize that other similar levels may also be useful, depending on the composition of the fiber mixture and polymer matrix. In one or more embodiments, the coupling agent includes (3-aminopropyl)trimethoxysilane, or other similar coupling agents. (3-Aminopropyl)trimethoxysilane is commercially available as BYK-C-80001. In one or more embodiments, the coupling agent couples the polymer matrix to the fibers of the first plurality of fibers and the second plurality of fibers. The coupling increases adhesion between the polymer matrix and embedded fibers, which can increase the final physical properties of the FRP rebar. One with skill in the art will appreciate that other coupling agents could be used, and the composition of the fiber mixture and polymer matrix and the identity of coupling agent would determine the effectiveness and the useful loading level of coupling agent. The coupling agent could work by any means that increases contact and adhesion between the polymer matrix and fibers of the first plurality of fibers and second plurality of fibers, including chemical reactions or intermolecular interactions. Poor adhesion between the polymer matrix and fibers in the FRP rebar can lead to poor mechanical properties, so proper use of a coupling agent can maximize mechanical properties of the FRP rebar.

Method to Fabricate FRP Rebar

One or more embodiments of the present disclosure relate to a method of preparing FRP rebar using a variant of a pultrusion process known as co-pultrusion. Pultrusion is an automated process for manufacturing fiber-reinforced composite materials into continuous, constant-cross-section profiles. In one or more embodiments, the method uses two different types of fiber rovings simultaneously in co-pultrusion. A method in accordance with one or more embodiments of this invention is shown in FIG. 1, which includes feeding a first plurality of fibers and a second plurality of fibers simultaneously into a resin impregnator, thereby forming a fiber mixture, wherein the first plurality of fibers includes carbon fibers and the second plurality of fibers is selected from the group consisting of glass, polyethylene terephthalate, and combinations thereof, at block 101; pulling the fiber mixture through a liquid polymeric resin in the resin impregnator to form a resin-soaked fiber mixture, at block 103; and passing the resin-soaked fiber mixture through a heated stationary die, where resin of the resin-soaked fiber mixture undergoes polymerization and cross-linking to form a fiber reinforced polymer FRP rebar, at block 105.

Figure 2:
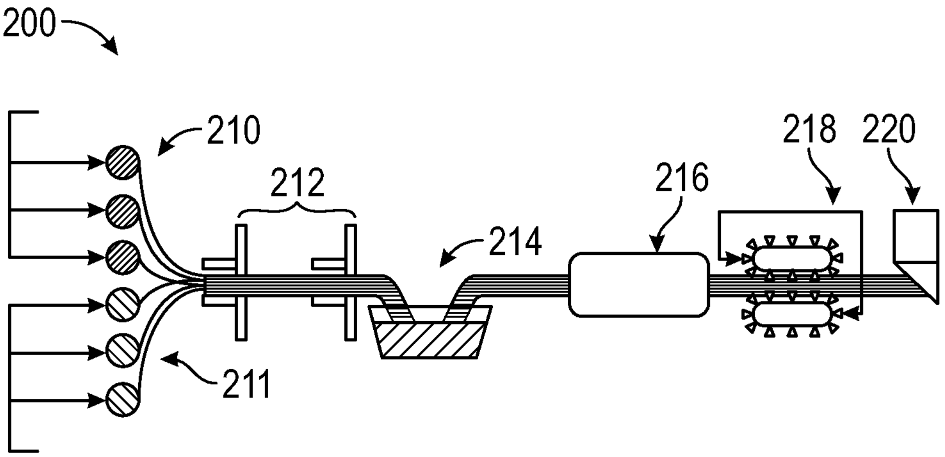
FIG. 2 is a schematic illustrating a method in accordance with one or more embodiments of the present disclosure.

FIG. 2 is a schematic illustration of the co-pultrusion apparatus and process according to embodiments of the present disclosure. As noted above, in one or more embodiments, the first step in the co-pultrusion process may include feeding a first plurality of fibers 210 and a second plurality of fibers 211 through fiber guiding plates 212, thereby forming a fiber mixture. The arrangement of fibers in FRP rebar may be controlled by the fiber guiding plates 212. The fiber guiding plates 212 may have a series of holes through which different fibers are fed. Different fibers may be fed through different holes to achieve a desired distribution of fibers in the FRP rebar. Thus, the configuration of holes in the fiber guiding plates determines the arrangement of fibers in the FRP rebar.

Each type of glass, PET, or carbon fibers in one or more embodiments may be maintained at a specific tension to ensure that when the FRP rebar is used to reinforce concrete, there are not any residual strains resulting from shrinkage. Tension in polymer fibers may lead to permanent thermoplastic deformations in the polymer fibers that may degrade the polymer fibers and decrease their performance. Polymer fibers have a high thermal expansion coefficient. Polymer fibers may have a high thermal expansion coefficient in the range of temperature in one or more embodiments. Because the coefficient of thermal expansion is of the same order of magnitude as the polymer matrix, pulling the polymer fiber without significant tension may minimize residual stress after cooling. Residual stresses may have detrimental effects on long-term performance of the FRP rebar through relaxation and creep.

In one or more embodiments, the selection of fibers and use of fiber guiding plates will allow for control of the relative volume ratio of the first plurality of fibers and the second plurality of fibers. In addition, in some embodiments, the local fiber orientation of the first plurality of fibers and the second plurality of fibers in the FRP rebar relative to the longitudinal direction of the FRP rebar may be controlled by proper process conditions.

Thus, in one or more embodiments, the tension in the first plurality of fibers and the second plurality of fibers may be different. This may not be effectively achieved with a conventional pultrusion process. As a result, compared to the process of pultrusion, where all fibers are held under the same tension, a difference in stiffness between the types of fibers may result in a difference in strain in the final FRP rebar which may impact the final performance of the FRP rebar.

In one or more embodiments, the two pluralities of fibers may be pulled at a speed of between 0.1 to 0.3 meters/minute. As may be appreciated by those skilled it the art, the speed may be adjusted as required to avoid problems such as fibers buckling in the process. The pulling speed is generally a compromise between FRP rebar quality and production rate.

The temperature range at which the fibers are pulled through the fiber guiding plates 212 may be in the range of between 30° C. to about 45° C. The temperature may have a lower limit of any of 30° C., 31° C., 32° C., 33° C., 34° C., 35° C., 36° C., and 37° C., to an upper limit of any of 38° C., 39° C., 40° C., 41° C., 42° C., 43° C., 44° C., and 45° C., where any lower limit may be paired to any mathematically compatible upper limit. The temperature may be maintained using infrared heaters.

In one or more embodiments, the pulling the fiber mixture through a liquid polymeric resin in the resin impregnator to form a resin-soaked fiber mixture in the co-pultrusion process may include pulling the first plurality of fibers and second plurality of fibers through a liquid polymeric resin in a resin impregnator 214 for resin impregnation to form a resin-soaked fiber mixture. The liquid polymeric resin in the resin impregnator may act as a resin bath to soak the fibers. The resin in accordance with one or more embodiments may be composed of oligomers, monomers, initiators, promoters, fillers, and UV inhibitors. Examples of oligomers that may be in the resin bath include vinyl ester, and acrylic acid. Examples of monomers that may be in the resin bath include styrene and methyl methacrylate. Examples of suitable initiators include methyl ethyl ketone peroxide, and dilauroyl peroxide. An example of a suitable promoter is cobalt naphthenate. Fillers, such as clay, may also be included in the resin bath. Examples of UV inhibitors that may be in the resin bath include carbon black, titanium oxide (TiO2), 2-hydroxy-benzophenone, 2-hydroxy-benzotriazole derivatives, or hydroxyphenyltriazine.

In one or more embodiments, fiber mixture may be pulled and bathed in a liquid polymeric resin under a specified speed and temperature. The speed at which the fibers may be pulled according to one or more embodiments is between 0.1 to 0.3 meter/minute. The temperature range between which the fiber mixture may be pulled through the resin impregnator according to one or more embodiments may be between 25° C. and 35° C. The temperature may have a lower limit of any of 25° C., 26° C. 27° C., 28° C., 29° C., and 30° C., and an upper limit of any of 31° C., 32° C., 33° C., 34° C., and 35° C., where any lower limit may be paired to any mathematically compatible upper limit. As the fiber mixture is pulled through the resin bath under the previously described conditions, the liquid polymeric resin is able to completely soak the fibers.

In one or more embodiments, the properties of the FRP rebar can be altered through the use of a coupling agent. (3-Aminopropyl)trimethoxysilane is an exemplary coupling agent. In such an embodiment, the coupling agent may be added to the liquid polymeric resin in the resin impregnator at a level of about 1 to 3 weight % of the liquid polymeric resin weight. While the coupling agent may typically be added to the liquid polymeric resin, it may also be utilized by having an optional initial bath that soaks the fiber mixture with coupling agent before the fiber mixture passes into the resin impregnator. In some embodiments, the use of an initial bath of coupling agent will be accompanied by a mild heating of about 40° C. This will in some embodiments improve the adhesion of fibers to polymer resin as well as the alkaline resistance of fibers. Those skilled in the art will understand that many possible ways of applying or incorporating the coupling agent at applicable levels are possible, and any that allow the coupling agent to couple the fibers and polymer matrix has the same desired final result.

After resin impregnation, the polymer resin of the resin-soaked fiber mixture in one or more embodiments may be polymerized and/or cured by passing it through a heated die 216 at a specific temperature based on if the polymer resin is a thermoset or thermoplastic, respectively. In one or more embodiments, the fibers may be pulled through the heated die at a speed of about 0.3 meter/min. The temperature of the die is adjusted to obtain a minimum of 95% curing of the polymer matrix according to ASTM D7957. Thus, the glass transition temperature of the polymer matrix is a key parameter driving the adjustment of the die temperature and resident time in the die. For each polymer, preliminary tests are required to verify the level of curing such that an appropriate die temperature may be chosen to achieve the desired level of curing. If this curing temperature is higher than the melting or glass transition temperature of the fibers being used, there will be inconsistencies in the cross-section of the FRP rebar which will harm its performance. Thus, the temperature should be appropriately selected so as to not damage the mechanical properties of the fibers.

In one or more embodiments, the shape of the opening in the heated die 216 may be circular with a diameter of about 10 mm. However, in other embodiments, different sized openings can be used to produce different diameter FRP rebars. The length of the heated die 216 in one or more embodiments may vary, and can be up to 1 meter.

As noted above, the temperature of the heated die may be selected based upon the type of resin being cured. Generally, the temperature of the heated die 216 may be up to 150° C. The maximum temperature of the heated die 216 depends on the type of matrix and fibers used. Additionally, the heated die may have sections with different temperatures to achieve a curing process that includes several different temperatures. For example, in one or more particular embodiments, the heated die 216 may be split to up to four sections each having a different temperature, where section 1 may be about 80° C., section two about 105° C., section 3 about 130° C., and section 4 about 150° C.

The polymer resin-soaked fiber mixture undergoes cross-linking and/or radical polymerization to form a FRP rebar as it is passed through the heated die 216. For example, in one or more embodiments, the resin impregnator 214 includes a resin bath of reactive low molecular weight vinyl ester species (oligomers) dissolved in a methyl methacrylate monomer solvent. The resin bath may also contain initiator and/or promoter systems and filler systems. The initiator and/or promoter combination, activated by temperature of the heated die 216, may initiate the reaction between vinyl ester and methacrylate units. The vinyl ester and methacrylate units, under gradual heating temperature profile, undergo a radical polymerization reaction, which includes crosslinking resulting in the final thermoset is formed. In one or more embodiments, radical polymerization may be the predominant reaction and not crosslinking (for thermoplastic materials). However, in other embodiments, crosslinking may be the primary reaction occurring in the heated die 216 area (thermosets).

Cross-linking reactions are exothermic, therefore once initiated, the temperature of the resin exceeds that of the die. Thus, near the end of the heating process, the temperature of the resin is higher than the temperature of the die. This increase in temperature initiates the removal of the FRP rebar from the heated die. To remove the FRP rebar from the heated die 216, pullers 218 pull the FRP rebar out of the heated die 216. Once removed, the FRP rebar is conveyed to cutters 220 that cut the formed FRP rebar into pieces of appropriate lengths.

Figure 3:
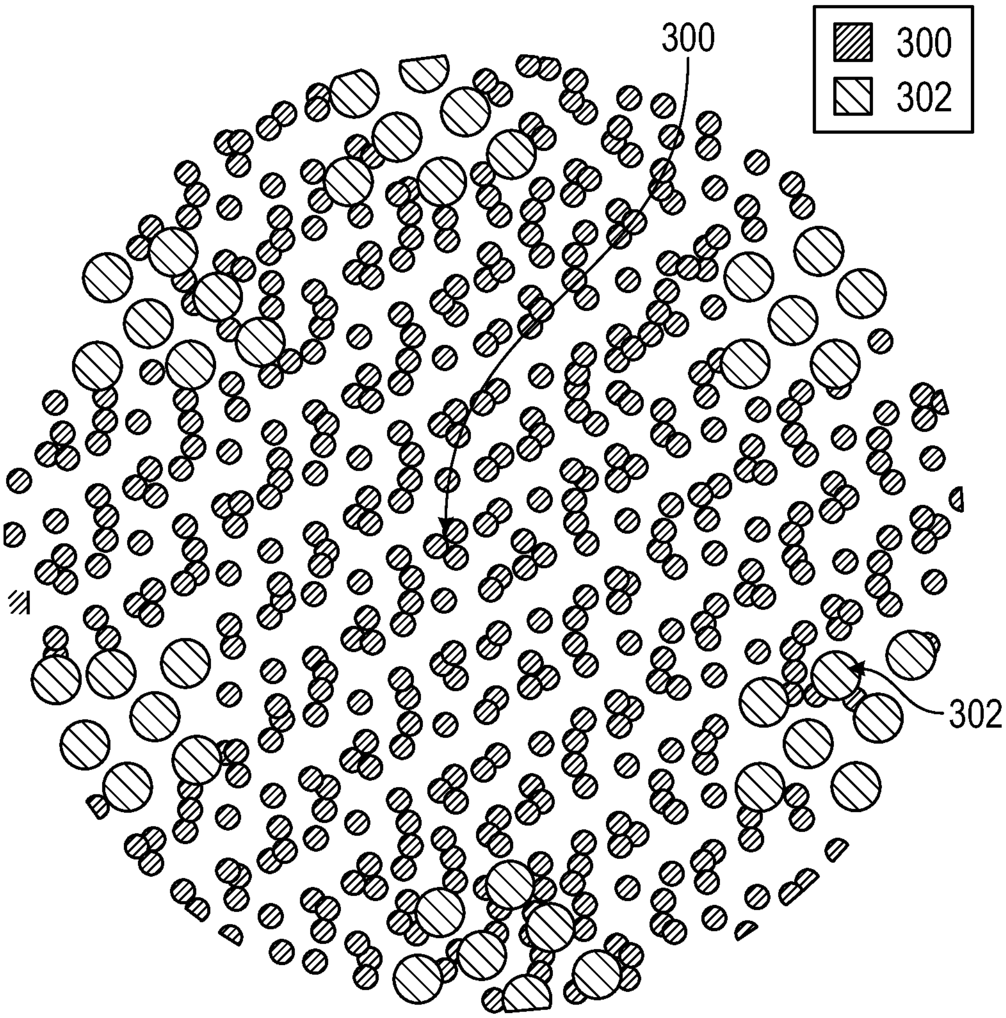
FIG. 3 is a is a schematic illustration of an uneven distribution of fiber types across a section of a FRP rebar in accordance with one or more embodiments of the present disclosure.

A benefit of the above described co-pultrusion process is the ability to control the distribution of the two fibers within and across the FRP rebar to optimize the load distribution and mechanical properties. To maximize the ductility effect in tension and bending, the ideal distribution between the two fibers may be a roughly even distribution throughout the FRP rebar. To maximize bending stiffness, the ideal distribution may be to have a high concentration of a stiff fiber at the outside and a high concentration of less stiff fiber at the inside. Examples of stiff fibers include carbon fibers. Examples of less stiff fibers may include glass fibers or polyester fibers. For example, as shown in FIG. 3, a FRP rebar with stiff fibers 302 located at its periphery and less stiff fibers 300 in the center will cause a significantly stiffer response for the FRP rebar in bending without changing the FRP rebar's stiffness and strength in the longitudinal axis. Those skilled in the art will understand that a variety of fiber arrangements with various corresponding properties are possible.

It will be understood that as used herein, "includes", and its variations, indicates includes, but is not limited to, and its respective variations.

EXAMPLES

An exemplary FRP rebar was prepared following the co-pultrusion method discussed above. Testing determined that when the polymer matrix makes up 30 vol. %, carbon fibers make up 42 vol. %, and PET fibers make up 28 vol %, all relative to the total volume of the FRP rebar, the tensile strength was 1.23 Gpa, the Young's modulus was 112.2 GPa, the ultimate tensile strain was 1.2%, and the shear strength was 283 MPa. Testing determined that when the polymer matrix makes up 30 vol. %, carbon fibers make up 42 vol. %, and glass fibers make up 28 vol %, all relative to the total volume of the FRP rebar, the tensile strength was 2.35 Gpa, the Young's modulus was 114.8 GPa, the ultimate tensile strain was 2.1%, and the shear strength was 339.9 MPa. The ASTM D7957/D7957M-17 method was used for rebar evaluation. These desirable properties, combined with the reduced cost of these compositions versus existing CFRP rebars demonstrate the usefulness of these compositions in reinforcing concrete. These compositions showed ultimate tensile strain more than 1%, both having elongations that will provide an alternative to the use of steel rebars.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A FRP rebar comprising a hybrid composition comprising:

15-45 vol. % of a polymer matrix; and 55-85 vol. % of a fiber mixture, wherein the fiber mixture comprises:

50-70 vol. % of a first plurality of fibers comprising carbon fibers distributed in the polymer matrix, and 30-50 vol. % of a second plurality of fibers selected from the group consisting of PET fibers, glass fibers, and combinations thereof distributed in the polymer matrix.

2. The FRP rebar of claim 1, wherein the polymer matrix comprises a thermoset polymer or a thermoplastic polymer.

3. The FRP rebar of claim 1, wherein the polymer matrix comprises vinyl ester, a polymethyl methacrylate, epoxy, polyurethane, and combinations thereof.

4. The FRP rebar of claim 1, wherein the FRP rebar comprises 1-3 wt. % of a coupling agent wherein the coupling agent improves adhesion of the first plurality of fibers and the second plurality of fibers to the polymer matrix, wherein the FRP rebar comprises 97-99 wt. % of the hybrid composition.

5. The FRP rebar of claim 4, wherein the coupling agent comprises (3-aminopropyl)trimethoxysilane.

6. A method of forming a FRP rebar composition, comprising:

feeding a first plurality of fibers and a second plurality of fibers simultaneously into a resin impregnator, thereby forming a fiber mixture, wherein the first plurality of fibers comprises carbon and the second plurality of fibers is selected from the group consisting of glass, polyethylene terephthalate, and combinations thereof;

pulling the fiber mixture through a liquid polymeric resin in the resin impregnator to form a resin-soaked fiber mixture; and passing the resin-soaked fiber mixture through a heated stationary die, where resin of the resin-soaked fiber mixture undergoes polymerization and cross-linking to form a fiber reinforced polymer rebar.

7. The method of claim 6, wherein feeding the first plurality of fibers and the second plurality of fibers comprises pulling the first plurality of fibers and the second plurality of fibers through fiber guiding plates.

8. The method of claim 6, further comprising pulling the first plurality of fibers and the second plurality of fibers into the liquid polymeric resin.

9. The method of claim 6, further comprising feeding the resin-soaked fiber mixture into the heated stationary die.

10. The method of claim 6, further comprising conveying the fiber reinforced polymer rebar into a cutter.

11. The method of claim 10, wherein the conveying is by puller units.

12. The method of claim 10, further comprising cutting the FRP rebar in the cutter into a plurality of pieces.

13. The method of claim 6, wherein the method comprises controlling a relative volume ratio of the first plurality of fibers and the second plurality of fibers.

14. The method of claim 6, wherein the method comprises controlling a distribution of the first plurality of fibers and the second plurality of fibers across the FRP rebar.

15. The method of claim 6, wherein the method comprises controlling a local orientation of the first plurality of fibers and the second plurality of fibers in the FRP rebar relative to a longitudinal direction of the FRP rebar.

16. The method of claim 6, wherein pulling the first plurality of fibers and the second plurality of fibers into a die allowing for curing to form a FRP rebar comprises heating the stationary die different temperatures along its length between about 50° C. and 200° C.

17. The method of claim 6, wherein feeding the resin-soaked fiber mixture comprises pulling the resin-soaked fiber mixture through fiber guiding plates.

18. The method of claim 6, wherein the liquid polymer resin is selected from the group consisting of a vinyl ester, a polymethyl methacrylate, epoxy, polyurethane, and combinations thereof.

19. The method of claim 6, further comprising adding a coupling agent to the liquid polymeric resin in the resin impregnator.

20. The method of claim 19, wherein the coupling agent comprises (3-aminopropyl)trimethoxysilane.

* * * * *